June 17, 1947.　　　　O. A. SHANN　　　　2,422,212

ADJUSTABLE STEP-BY-STEP MOTOR

Filed Oct. 2, 1943　　　2 Sheets-Sheet 1

INVENTOR
O. A. SHANN
BY
ATTORNEY

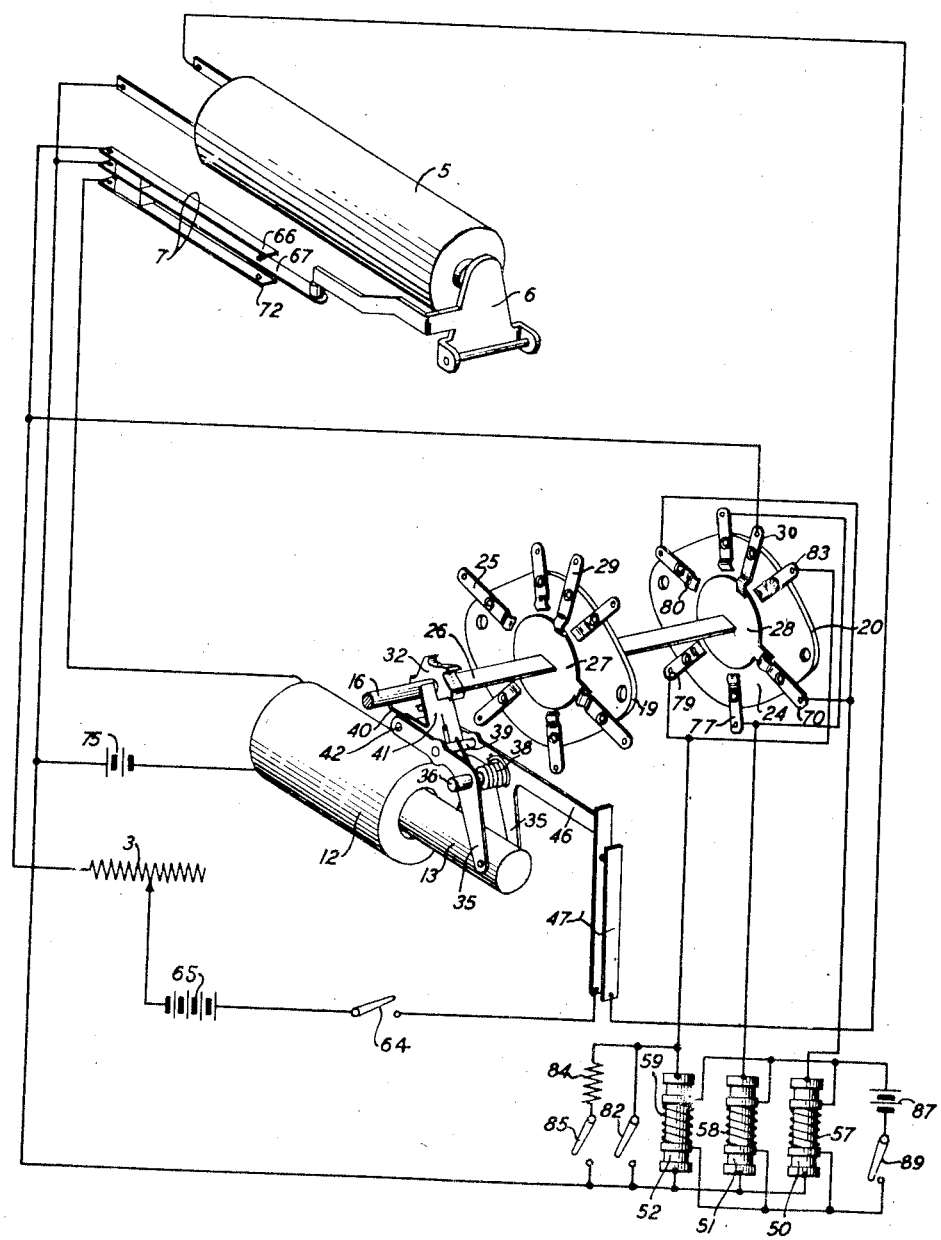

Patented June 17, 1947

2,422,212

UNITED STATES PATENT OFFICE 2,422,212

ADJUSTABLE STEP-BY-STEP MOTOR

Oscar A. Shann, Short Hills, N. J., assignor to Bell Telephone Laboratories, Incorporated, New York, N. Y., a corporation of New York Application October 2, 1943, Serial No. 504,687

7 Claims. (Cl. 172—240)

1

This invention relates to switching devices and particularly to improvements in electrically operated switching devices and speed control means therefor.

An object is to simplify the speed adjusting and regulating means for switching devices and to reduce the cost of such means.

Heretofore switching devices have been provided of the step-by-step type in which the speed of stepping has been controlled by various time controlled mechanisms such as clockwork or electrical impulse regulators or other mechanical governing devices.

The present invention relates to such time controlled step-by-step mechanisms electrically operated and a feature thereof is a rotary step-by-step switch having thermal elements having a negative temperature coefficient of resistance connected to succeeding contacts and a rotating arm to connect with said elements through said contacts and a pawl and ratchet mechanism with a controlling stepping magnet and a pulsing relay and circuit connections therefor, whereby when a circuit from a source of current is closed for this pulsing relay it merely operates self-interrupting contacts to act as a buzzer until a thermal element is heated sufficiently to permit current to pass through the relay to fully operate it. As the relay operates fully it closes a circuit from another source to actuate the stepping magnet to rotate the arm one step. This steps the arm to a succeeding contact and thermal element and opens the energizing circuit for the relay so that these operations are now repeated at intervals as determined by the thermal lag of the succeeding thermal elements.

Another feature is a rheostat arrangement for the current supply for the thermal elements and the pulsing relay to regulate the speed of the stepping operations.

Another feature is an arrangement whereby different thermal elements may be interchanged in the connections for the contacts or for partially or completely short-circuiting them so that various time lags may be secured between succeeding steps of the switch as desired.

Another feature is a circuit and switching arrangement whereby the thermal elements may be normally maintained at a desired standard temperature so as to be unaffected by external atmospheric conditions and thereby secure constant thermal characteristics for succeeding steps of the switch.

The arrangement has been illustrated in the accompanying drawings in which:

Fig. 5 is a diagram of the control circuit for the switch shown in the preceding figures with the mechanism shown in fragmentary perspective views.

Figure 1:
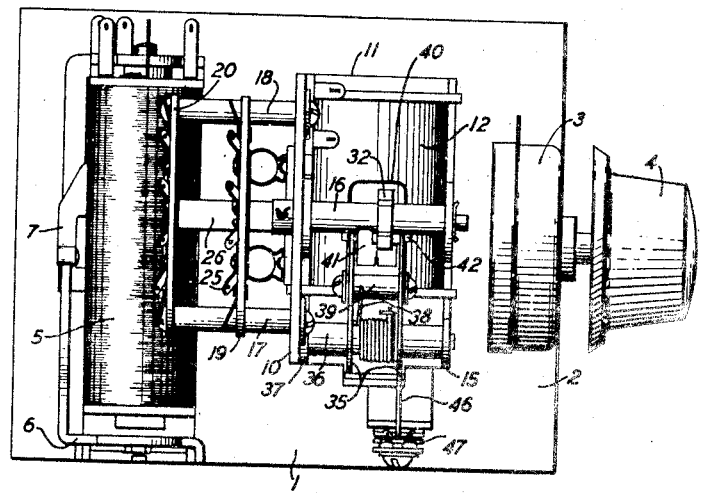
Fig. 1 shows a top view of a step-by-step mechanism embodying the applicant's invention.
Figure 4:
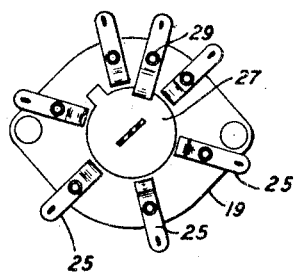
Fig. 4 is a front view of the operating arm and contact arrangement.
Figure 3:
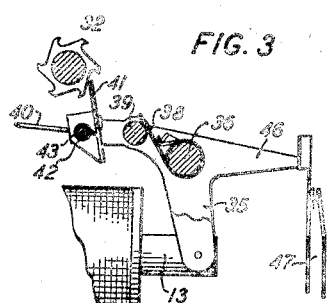
Fig. 3 is a partial side view of the pawl and ratchet mechanism and the stepping magnet.
Figure 2:
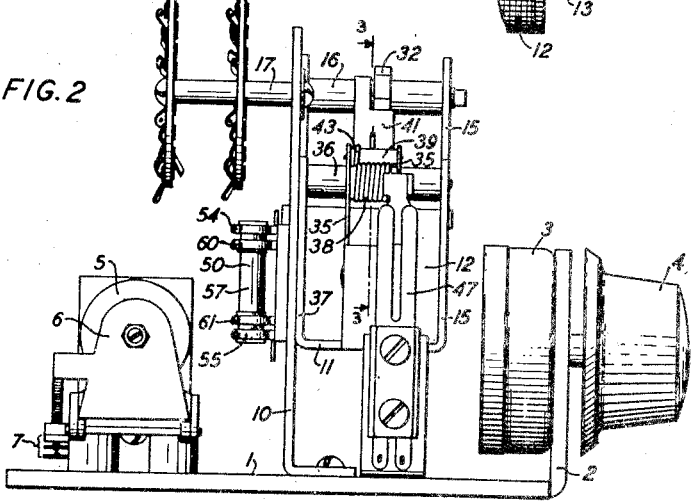
Fig. 2 is a side view of the mechanism shown in Fig. 1.

Referring now to the drawings, the stepping mechanism and the associated parts are mounted on the base-plate 1 having an angular extension 2 on which the rheostat 3 is mounted and controlled by a knob 4. On this base-plate 1 is mounted the stepping relay 5 having an armature 6 and operating and interrupting contacts 7. On this base-plate is also mounted a bracket 10 on which is mounted a U-shaped bracket 11 between the side members of which is mounted the stepping magnet 12. This magnet is in the form of a coil having a solenoid plunger 13. Between the bracket 10 and the right-hand side member 15 of bracket 11 is mounted a shaft 16, and between the two posts 17 and 18 secured to bracket 10 are mounted two insulation discs 19 and 20 to each of which is secured a series of equally spaced contacts 25 as shown, for example, in Fig. 4. To the shaft 16 is secured an extension shaft 26 on which is in turn mounted two wiper arms 27 and 28 for rotation to contact with the contacts 25 and to the plates 19 and 20 are mounted contacting terminals, such as 29 and 30, for electrically connecting circuits to the wiper arms 27 and 28, respectively. To shaft 16 is also secured a ratchet wheel 32. To the plunger 13 is secured a lever 35 having two parallel side members mounted on a shaft 36 which is secured between the members 15 and 37 of bracket 11. On this shaft 36 is mounted a spiral spring 38 having one end connected to the lever 35 and the other end connected to a post 39 also secured between the two side members of the lever 35. Between these two side members of the lever 35 is also mounted an operating pawl 40 in the form of a U-shaped wire secured to holding pawl 41 in the shape of a flat spring with side lugs normally rotatably mounted on a shaft 42 secured to the side members of lever 35. On shaft 42 is a spiral spring 43 having one end secured to the lever 35 and the other end secured to the pawl 41 to normally press this pawl against the teeth of ratchet wheel 32. On the energization of the magnet 12, the plunger 13 is attracted inside the magnet 12 and the lever 35 is rotated on the shaft 36 to cause the U-shaped wire operating pawl 40 to engage a tooth in the ratchet wheel 32 and rotate it one step while the holding pawl 41 engages the next tooth and prevents the ratchet wheel from moving as the step is completed. The right-hand side member of the lever 35 looking at Fig. 1 is provided with an extension arm 46 which normally engages one of the contacts 47 to maintain them closed while the magnet is in unoperated condition and to open the connection between them when the plunger is attracted inside the coil magnet 12. On the bracket 10 may be mounted a series of thermal elements having a negative temperature coefficient of resistance, such as 50, 51 and 52 in clamping terminal clips, such as 54 and 55 for element 50. Each thermal element may be provided with an external heating winding such as 57, 58, and 59, respectively. These heating windings may be connected by means of terminal clips such as 60 and 61 for winding 57 shown in Fig. 2.

Referring now to the circuit diagram in Fig. 5, the operation of this switching mechanism is as follows. To start the mechanism operating the switch 64 may be closed and this closes a circuit for the operation of relay 5 over a circuit from battery 65, the rheostat 3, contacts 7, winding of relay 5, contacts 47, switch 64 back to battery 65. This causes the relay 5 to operate sufficiently to open the connection at contacts 7 between self-interrupting contacts 66 and 67. It should be noted that at this time there will also be a circuit completed from the battery 65 as follows: Battery 65, rheostat 3, contact 30, arm 28, contact 70, thermal element 50, winding of relay 5, contacts 47, switch 64, back to battery 65. The resistance of the thermal element 50 is such at this time that relay 5 will not get sufficient current to operate its armature 6 any further, but in fact causes it to release and again close the connection between contacts 66 and 67. As these contacts close the circuit through the thermal element 50 is shunted and relay 5 will now receive another impulse of current directly through contacts 66 and 67 to again partially operate it to open the connection between contacts 66 and 67, and again permit the current to pass through the element 50 and thereby cause relay 5 to release. These operations are repeated at intervals depending on the position of rheostat 3 which regulates the speed of these operations in conjunction with the thermal elements as will presently be described. The relay 5 then will therefore operate as a buzzer and each time it operates a certain amount of current is passed through the element 50. These impulses of current through element 50 cause it to gradually increase its temperature and thus gradually reduce its resistance with a consequent increase in current for succeeding impulses. After a certain number of these impulses have been delivered through the element 50 and depending on the thermal characteristics or thermal lag of this element 50 a final impulse will be of such current value as to cause the relay 5 to operate to fully attract its armature 6 and thus close the connection between contacts 67 and 72 and to maintain the relay operated over the circuit through the element 50. Contacts 72 and 67 now close a circuit for the stepping magnet from a battery 75, contacts 67 and 72, winding of magnet 12, back to battery 75. This causes the magnet 12 to attract its plunger 13 and the lever 35 is operated to actuate pawl 40 to rotate the shaft 16 one step. The wiper arm 28 is thereby advanced one step so that it will leave contact 70 and engage a succeeding contact 77. As the connections through contacts 47 and between contact 70 and wiper 28 are now open the circuit for element 50 and relay 5 will be broken. This releases relay 5 which now opens the connection between contacts 72 and 67 and closes the connection between contacts 67 and 66 which causes the release of the magnet 12 and permits the solenoid 13 to return to normal which causes the closure of the contacts 47. Relay 5 is now again operated and released as before but a new circuit is provided through arm 28 and contact 77 for the thermal resistance element 51 and after a certain interval depending on the terminal lag of this element 51 relay 5 is fully operated and closes the circuit for magnet 12 to advance the arm to establish a connection through a succeeding contact 79 and a succeeding thermal element 52. The operations described will then be repeated to advance the arm 28 another step to engage contact 80. When this takes place, the thermal element 50 will again be included in the circuit and receive a series of impulses to again increase in temperature and decrease in resistance to operate the relay 5 completely. In this manner the three resistance elements 50, 51 and 52 serve as shown in this case for six succeeding steps for each rotation of the shaft 16 and the thermal lag of these elements will determine the intervals between the steps of the magnet 12 to rotate the shaft 16 and the arm 28.

As stated, these thermal elements may have the same or different thermal lag characteristic and may be interchanged to determine the intervals between steps. It should be observed that some of these elements, for example 52, may be short-circuited by a switch such as 82 so that when the switch has been advanced to have arm 28 contact with contact 79 or 83 the relay 5 will be immediately operated and the interval between steps will in these cases be exceedingly short. On the other hand, this element or any of the other elements may be partially shunted by a resistance, such as 84, by the closing of a switch 85 and thus change the thermal lag of this element 52 to some other value depending on the resistance 84 and, consequently, change the time interval required for arm 28 to leave contact 79 and connect with contact 80 and for it to leave contact 83 and connect with contact 70.

As noted, the elements 50, 51 and 52 may also be provided with heating windings, such as 57, 58 and 59, respectively, heated by a battery 87 on the closure of a switch 89 to a certain fixed temperature which, therefore, will cause these elements to maintain a specific constant temperature regardless of surrounding atmospheric conditions. Consequently, very accurate timing between steps may be obtained by these elements, being set at a normal fixed temperature before they are included in the circuits to receive impulses. By this step-by-step switching arrangement and circuits including the thermal elements and rheostat 3 for the battery 65 almost any combinations of intervals between steps of the step-by-step mechanism may be obtained automatically and with great accuracy. This mechanism may be employed for various purposes, for example, to indicate time intervals or to control other electrical apparatus at stated intervals. This may be accomplished by having different electrical circuits for these purposes closed, through terminal 29 and arm 27 to contacts 25 in succession as the shaft 26 is rotated in steps.

What is claimed is:

1. The combination of a step-by-step mechanism with elements having a negative temperature coefficient of resistance to current therethrough, a source of current therefor and means for stepping said mechanism at intervals under control of current from said source when increased through said elements as effected by said resistance characteristics.

2. In a time measuring device, a step-by-step mechanism and means including elements having different negative temperature coefficients of resistance to current therethrough for stepping said mechanism at intervals by current increases through said elements in succession, effected by said different resistance characteristics and for controlling the frequency of occurrence of said stepping in accordance with said different resistance characteristics of said elements.

3. In combination, a step-by-step mechanism, a source of current, elements having different negative temperature coefficients of resistance to current therethrough, a variable resistance for varying current from said source, and means for stepping said mechanism at intervals by current increases through said elements effected by said different resistance characteristics thereof, and means for controlling the frequency of occurrence of said stepping in accordance with the setting of said variable resistance, and in accordance with said different resistance characteristics of said elements.

4. In combination a step-by-step mechanism, including a wiper and terminals and a stepping magnet operative to advance the wiper from connection with one terminal into connection with succeeding terminals on each operation of said magnet, elements having negative temperature coefficients of resistance to current therethrough, a source of current and means for actuating said magnet at intervals under control of current from said source when increased through said elements as effected by said resistance characteristics thereof and including circuits for said elements established by said wiper and succeeding terminals as the wiper is advanced from one terminal to another.

5. In combination, a step-by-step mechanism including an operating magnet, elements having a negative temperature coefficient of resistance associated with said mechanism, a pulsing relay, sources of current, circuit means for alternately partially operating and releasing said pulsing relay by current from one of said sources, and for simultaneously passing current from said one source through one of said elements and for fully operating said relay by an increased current through said circuit means from said one source when the resistance through said one element is decreased to a certain value as effected by its negative temperature coefficient of resistance, and circuit means controlled on said full operation of said relay for operating said magnet by current from said other source to open said first-mentioned circuit means to release said relay and to actuate said mechanism to disconnect said associated element from said first circuit means and connect a succeeding such element in said first circuit means for repeating of said control operations of said two circuit means for said relay and magnet, the time intervals of such repeated operations being determined by the time it takes to decrease the resistance in said succeeding elements to said certain values.

6. In combination, a step-by-step mechanism including an operating magnet, elements having different negative temperature coefficients of resistance associated with said mechanism, a pulsing relay, sources of current, circuit means for alternately partly operating and releasing said pulsing relay by current from one of said sources and for simultaneously passing current from said one source through one of said elements and for fully operating said relay by an increased current through said circuit means from said one source when the resistance through said one element is decreased to a certain value as effected by its particular negative coefficient of resistance, circuit means controlled on the full operation of said relay for operating said magnet by current from said other source to open said first-mentioned circuit means to release said relay and to actuate said mechanism to disconnect said one element from said first circuit means and connect a succeeding element in said first circuit means for the repeating of said control operations of said two circuit means of said relay and magnet, the time intervals of such repeated operations being determined by the time it takes to decrease the resistance in said succeeding elements to said certain values, and a variable resistance in said first circuit means for regulating the current flowing therethrough from said first source to various values so that the time intervals of the repeated operations of said circuit means may be varied in accordance with the setting of said variable resistance and the time it takes for said different settings to decrease the resistance of said succeeding elements to said certain values.

7. In combination, a step-by-step mechanism including a wiper and terminals and a stepping magnet operative to advance the wiper from connection with one terminal into connection with a succeeding terminal on each operation of said stepping magnet, a control relay having self-interrupting contacts, a source of current, a circuit including the winding of said relay, said source of current and the self-interrupting contacts of said relay for partially actuating and releasing said relay when said circuit is closed, another circuit including said source of current and said wiper and one of said terminals, when said wiper is resting on said terminal through the associated elements in shunt of said self-interrupting contacts of said relay to cause current from said source to flow through said element to increase its temperature and thereby lower its resistance so that an increase in current from said source will flow through said relay circuit to fully operate it when said increase in current is of a certain value, a second source of current, a circuit for said magnet including said second source of current and controlled by said relay when fully operated to actuate said magnet and step the wiper of said mechanism to disconnect from said terminal and connect with a succeeding terminal and to open said first-mentioned circuit to release said relay for the repeating of such operations of said relay and magnet on succeeding steps of the mechanism, the frequency of occurrence of said operations depending on the time it takes to increase the current through said succeeding elements after they are connected in the shunt of the self-interrupting contacts of said relay.

OSCAR A. SHANN.

REFERENCES CITED

The following references are of record in the file of this patent:

UNITED STATES PATENTS

| Number | Name | Date |
| --- | --- | --- |
| 2,196,173 | Black | Apr. 9, 1940 |
| 952,778 | Wohl et al. | Mar. 22, 1910 |
| 393,132 | Wagner | Nov. 20, 1888 |
| 1,795,013 | Denman | Mar. 3, 1931 |
| 1,914,215 | Price | June 13, 1933 |
| 1,044,507 | Edwards et al. | Nov. 19, 1912 |